US012746787B2

(12) United States Patent
Lee, Jr. et al.

(10) Patent No.: US 12,746,787 B2
(45) Date of Patent: Sep. 29, 2026

(54) TRAILER COUPLER WITH INTEGRATED LOCK

(71) Applicant: DYNAMIC MANUFACTURING GROUP LLC, Palmetto, FL (US)

(72) Inventors: Ronald Lee, Jr., Ruskin, FL (US); Anthony Sansone, Parrish, FL (US)

( * ) Notice: Subject to any disclaimer, the term of this patent is extended or adjusted under 35 U.S.C. 154(b) by 823 days.

(21) Appl. No.: 17/935,244

(22) Filed: Sep. 26, 2022

(65) Prior Publication Data

US 2024/0100893 A1 Mar. 28, 2024

(51) Int. Cl.
*B60D 1/06* (2006.01)
*B60D 1/58* (2006.01)

(52) U.S. Cl.
CPC ............. *B60D 1/065* (2013.01); *B60D 1/583* (2013.01)

(58) Field of Classification Search
CPC ................................ B60D 1/065; B60D 1/583
USPC .......................................................... 280/507
See application file for complete search history.

(56) References Cited

U.S. PATENT DOCUMENTS

| | | | | |
|---|---|---|---|---|
| 3,139,291 | A | 6/1964 | Geresy | |
| 3,391,555 | A | 7/1968 | Mamo | |
| 3,410,580 | A | 11/1968 | Longenecker | |
| 3,514,980 | A | 6/1970 | Doyle | |
| 3,770,299 | A | 11/1973 | Murphy | |
| 5,018,759 | A | 5/1991 | Villalon et al. | |
| 6,481,740 | B1 | 11/2002 | Haase et al. | |
| 6,505,849 | B1 | 1/2003 | Ebey | |
| 7,300,068 | B1 | 11/2007 | Johnsen | |
| 7,353,671 | B2 | 4/2008 | Recknagel et al. | |
| 7,690,673 | B1 * | 4/2010 | Kraai | B60D 1/065 280/507 |
| 8,083,249 | B2 | 12/2011 | Most et al. | |
| 8,235,411 | B2 | 8/2012 | Works et al. | |
| 11,623,485 | B1 * | 4/2023 | Harms | B60D 1/583 280/507 |
| 2001/0023601 | A1 * | 9/2001 | Gilbertson | E05B 77/34 70/258 |
| 2007/0175246 | A1 | 8/2007 | Hsai | |
| 2009/0066059 | A1 | 3/2009 | Most et al. | |
| 2009/0102159 | A1 * | 4/2009 | Van Laere | B60D 1/60 280/507 |
| 2012/0098236 | A1 * | 4/2012 | Works | B60D 1/60 280/507 |

* cited by examiner

*Primary Examiner* — Alentin Neacsu
*Assistant Examiner* — Mohamed M Medani
(74) *Attorney, Agent, or Firm* — Derek Fahey, Esq.; The Plus IP Firm, PLLC

(57) ABSTRACT

A trailer coupler includes a lock contained within a channel in a coupler body. A pin extends from the lock. The pin extends through an aperture in an end of the channel and through an aperture in a latch handle when the lock is locked. In such configuration, the pin prevents pivoting the latch handle to an open (unlocked) position. Unlocking the lock allows the lock to be moved at least partially out of the channel, which removes the pin from the aperture in the handle, allowing the handle to pivot to an open (unlocked) position.

17 Claims, 12 Drawing Sheets

TRAILER COUPLER WITH INTEGRATED LOCK

FIELD OF THE INVENTION

This invention relates generally to trailer couplers, and, more particularly, to a trailer coupler for a ball hitch.

BACKGROUND OF THE INVENTION

Conventional trailer couplers include an exposed latch handle and a sheet metal flange. Holes in the handle and flange align when the latch handle is in a locked position. A shackle of a lock may extend through the holes to lock the latch handle to the flange. Being fully exposed, the shackle and lock are vulnerable to compromise by thieves. Bolt cutters, hacksaws, reciprocating saws, and angle grinders are among the tools a thief may use to defeat the lock.

An aftermarket of security devices for trailer couplers has emerged. Most such devices are bulky coverings that lock to the coupler with a fully or partially covered lock core or puck lock. Such devices can be extremely effective theft deterrents. However, they can be costly, bulky and somewhat inconvenient to use.

Tubular cylinder locks for vending machines (i.e., "vending style locks") are ubiquitous. Many such locks have a lug that extends radially from the lock core when the lock is locked, and retracts to the lock core when the lock is unlocked. The lug extends into a small compartment of a body or behind a panel when the lock is locked. Rotational force applied to the lock core relative to the compartment may apply shearing force to the lug. Sufficient rotational force can cause the lug to fail, either by breaking or dislodging from the core.

A coupler with a more secure locking mechanism is needed. The coupler should be easy to lock. The coupler should cover the locking mechanism when the coupler is locked. The coupler should provide a higher level of security than a conventional coupler. The coupler should be compatible with at least some aftermarket security devices. The locking mechanism of the coupler should not be vulnerable to failure due to rotational force.

The invention is directed to overcoming one or more of the problems and solving one or more of the needs as set forth above.

SUMMARY OF THE INVENTION

To solve one or more of the problems set forth above, in an exemplary implementation of the invention, a trailer coupler includes an integrated lock. The trailer coupler includes a coupler body with a lock section. A lock channel extends substantially through the lock section of the body. A lock core (which includes a cylinder and a plug) and a locking pin extending from the cylinder is inserted into the lock channel in the coupler body. A locking end of the lock section of the coupler body, includes an aperture sized and shaped to allow passage of the locking pin, when the locking pin is in a locked position. A latch handle includes a locking portion that aligns with the aperture of the lock section, when the latch handle is in a locked position. The locking portion of the latch handle includes an aperture sized and shaped to allow passage of the locking pin, when the locking pin is in a locked position. Thus, when the locking pin is in a locked position, the locking pin extends through the aperture in the locking end of the lock section of the coupler body and also through the aligned aperture in the locking portion of the latch handle. Additionally, the coupler body may include a locking panel. The locking portion of the latch handle is disposed between the locking panel and the locking end of the lock section of the coupler body, when the latch handle is in a locked position. The locking panel may include a cavity that is sized and shaped to receive a free end of the locking pin when the locking pin is in a locked position. Thus, when the locking pin is in a locked position, the locking pin extends through the aperture in the locking end of the lock section of the coupler body and also through the aligned aperture in the locking portion of the latch handle, and into the cavity in the locking panel. The locking panel is spaced apart from the locking end of the lock section of the coupler body. The space between the locking panel and the locking end of the lock section of the coupler body is a gap in which the locking portion of the latch handle is received when the latch handle is in a locked position. Preferably, the gap is not much wider than necessary to receive the locking portion of the latch handle when the latch handle is in a locked position. Additionally, the outermost surface of the latch handle covers the gap. Thus, when the latch handle is in the locked position, the portions of the locking pin that extend from the aperture in the locking end of the lock section of the coupler body and through the aligned aperture in the locking portion of the latch handle and into the cavity in the locking panel are all covered by the outermost surface of the latch handle. Therefore, the locking pin is protected from access with a saw blade.

The lock plug includes at least one lug the extends radially when the lock core is in a locked position, and retracts radially to an elevation about even with the cylinder when the lock core is in an unlocked position. The lug may be a polyhedron or cylinder.

An annular groove is provided in the lock channel. The annular groove may extend 360 degrees. The groove is configured (i.e., sized, shaped and located) to receive the lug(s) of the lock core, when the lugs extend radially when the lock core is in a locked position. The lock core may rotate 360 degrees with the lugs within the groove. Thus, the lugs cannot be sheared off by spinning the lock core.

The cylinder includes a longitudinal slot. The longitudinal slot has a proximal end and a distal end. The proximal end is closer than the distal end to the opening of lock channel. A set screw is threaded into a threaded channel in the lock section. A tip of the set screw extends into the longitudinal slot. When the lock core is the locked position, the set screw extends into the longitudinal slot at or proximate the proximal end. When the lock core is the unlocked position, the lugs are removed from the annular groove and the lock core may slide outwardly from the channel until the tip of the set screw hits the distal end of the slot. The range of travel is sufficient to withdraw the locking pin from the cavity in the locking panel and from the aperture of the locking portion of the latch handle. Thus, by unlocking and sliding the lock core outwardly until stopped by the set screw, the locking pin is withdrawn from the cavity in the locking panel and from the aperture of the locking portion of the latch handle, and the handle may be pivoted to an unlatched position.

A connecting rod couples the base of the latch handle to an underjaw. The underjaw is a polyhedron with a face configured to abut a portion of a trailer hitch ball. The connecting rod extends through a channel in the core body. The connecting rod channel extends to an underjaw channel at the back side of the coupler socket. The underjaw is positioned against at least a portion of the bottom half of a trailer hitch ball when the underjaw is in a locked position. The underjaw is withdrawn away from the trailer hitch ball and into the underjaw channel when the underjaw is moved to an unlocked position. The motion of the underjaw is caused by reciprocating motion of the connecting rod within the connecting rod channel. Pivoting motion of the latch handle causes the reciprocating motion of the connecting rod within the connecting rod channel. The latch handle is restrained from such pivoting motion when it is locked by the locking pin. The latch handle is unrestrained from such pivoting motion when the locking pin withdrawn from the aperture of the locking portion of the latch handle.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
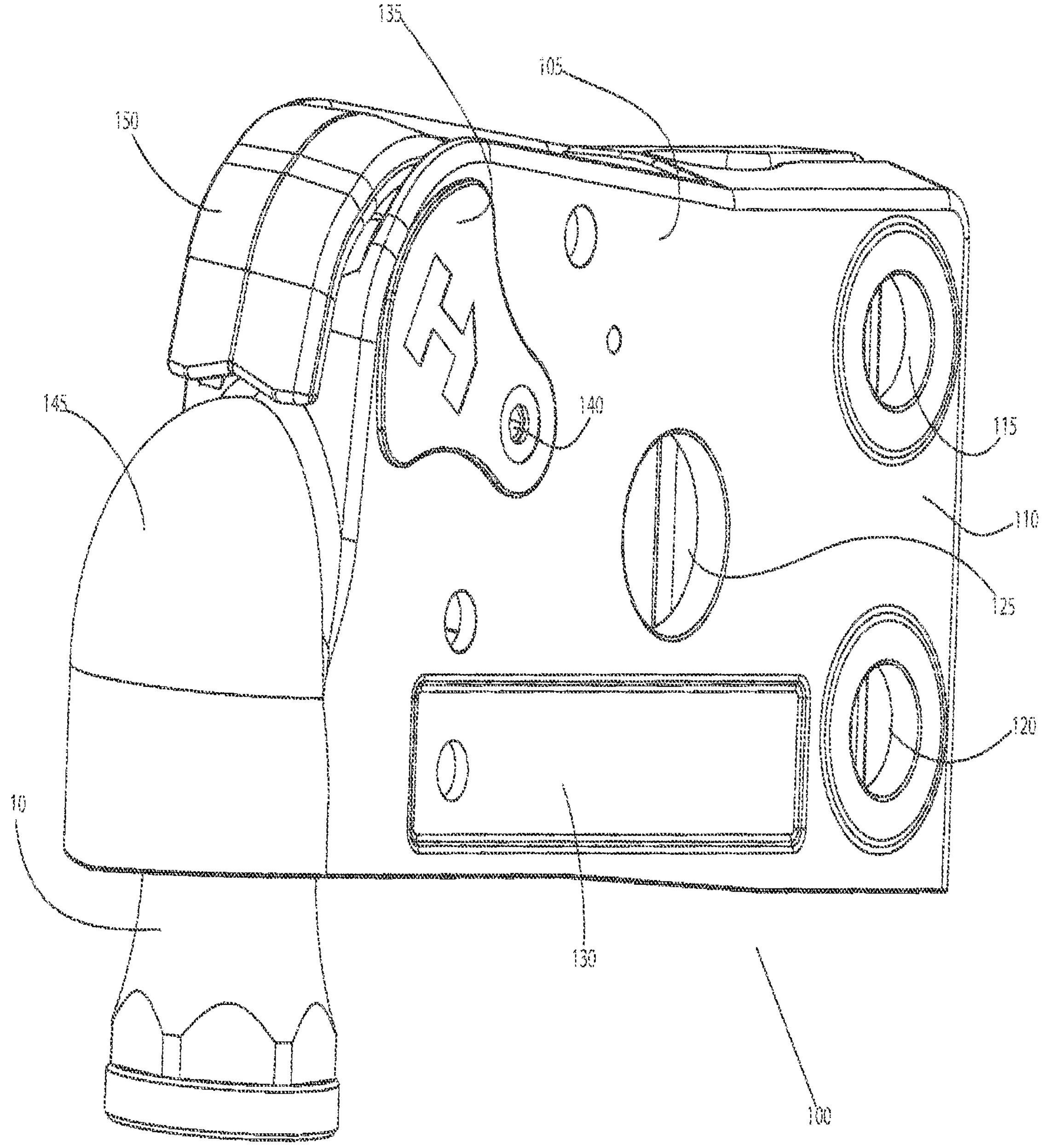
FIG. 1 is a first perspective view of an exemplary coupler locked to a hitch ball according to principles of the invention.

FIG. 1 is a first perspective view of an exemplary coupler 100 locked to a hitch ball 10 according to principles of the invention. The hitch ball 10 is received in a socket 144 (FIG. 4) formed in the leading edge 145 of the coupler 100.

A latch handle 150 is in a closed or locked position. The locked latch handle 150 is substantially flush with the coupler body 105, providing a very limited target for destruction by thieves and vandals. The coupler body 105 may be integrally formed (i.e., formed as a unitary structure), such as by casting and/or machining.

A lock cover 135 pivots about a screw 140 that serves as a pivot point. The lock cover 135 conceals a compartment that contains a lock core. The cover 135 protects the lock core from dirt, debris and the elements.

Holes 115, 117, 120, 122 (FIGS. 1, 4) are provided for mounting nuts and bolts. Four nuts and bolts may be used to secure the coupler 100 to a mounting channel. The width of the coupler at the tail end 110 is about equal to the interior width of a mounting channel. Thus, the tail end 110 of the coupler 100 may be received in the channel, and bolts may be inserted through holes in the sides of the channel aligned with coupler mounting holes 115, 117, 120, 122. Nuts may be secured in the interior space of the coupler 100, between the back wall 106 of the coupler 100 and the rib 119. The space between the rib 119 and the back wall 106 may be sufficient to receive a standard hexagonal nut, but prevent rotation of the nut. This configuration facilitates installation.

Figure 6:
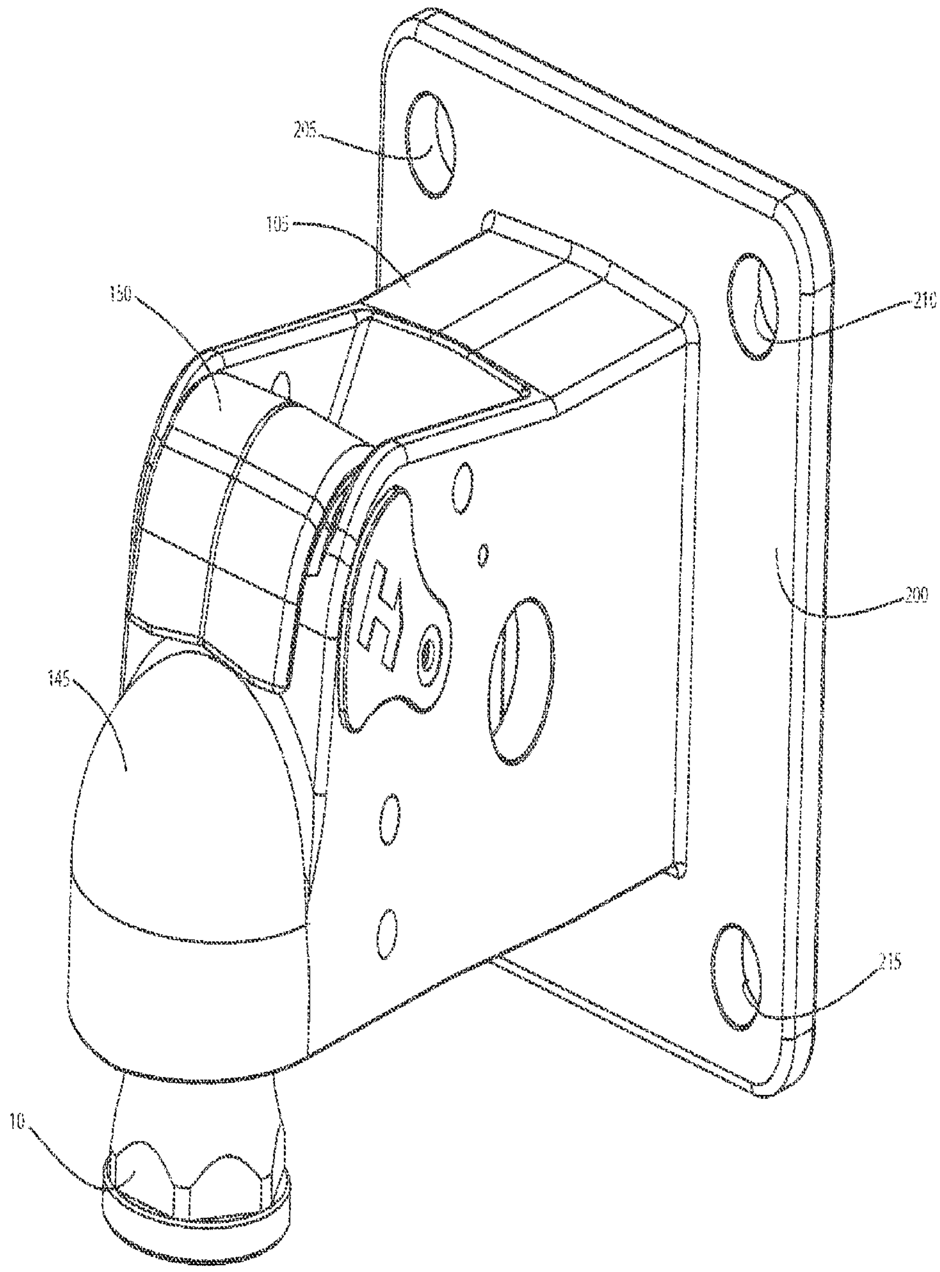
FIG. 6 is a first perspective view of an exemplary coupler with a flat mount according to principles of the invention.
Figure 7:
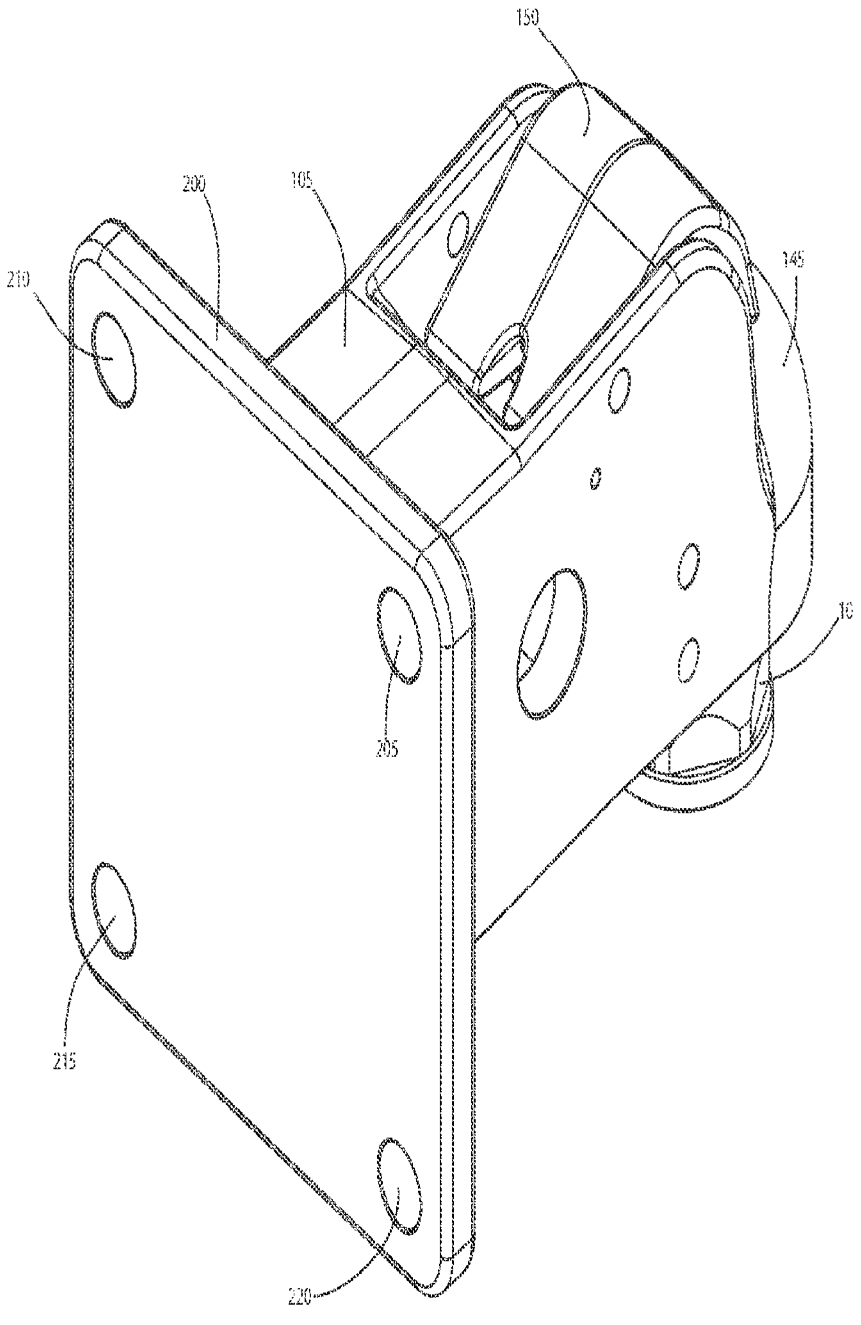
FIG. 7 is a second perspective view of an exemplary coupler with a flat mount according to principles of the invention.

The invention is not limited to channel mounting. Any mount suitable for attaching a coupler to a trailer may be adapted without departing from the scope of the invention. For example, FIGS. 6 and 7 conceptually illustrate an exemplary coupler 100 with a flat mount 200. The flat mount 200 includes a plurality of mounting holes 205-220.

Other holes and features may be provide in the coupler body. For example, a panel 130 may be formed for branding. Additional holes, e.g., hole 125, may be provided to reduce weight or to provide mounting options. An access slot 170 may also be provided for additional mounting options.

Figure 2:
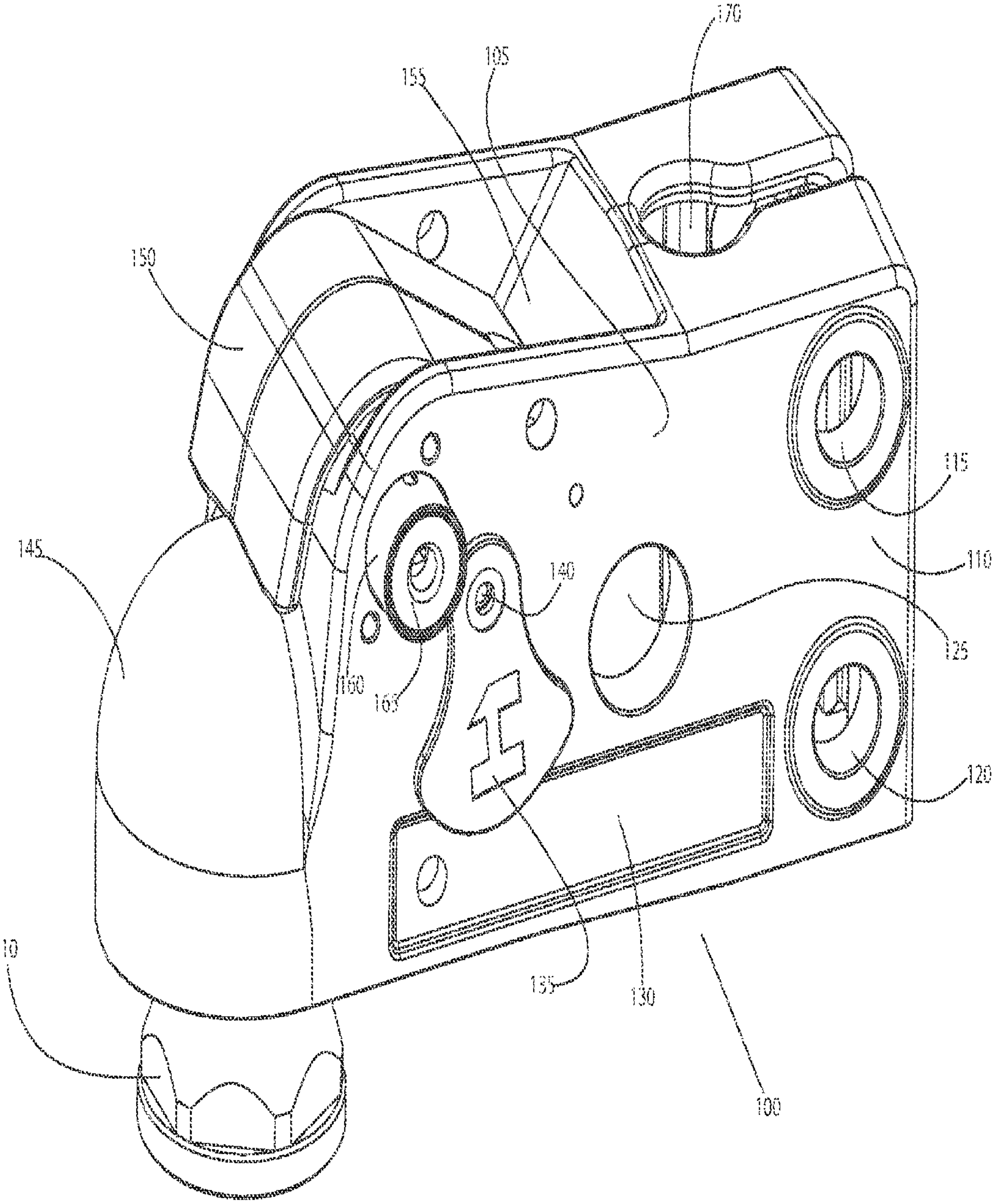
FIG. 2 is a second perspective view of an exemplary coupler with an unlocked locking mechanism according to principles of the invention.
Figure 3:
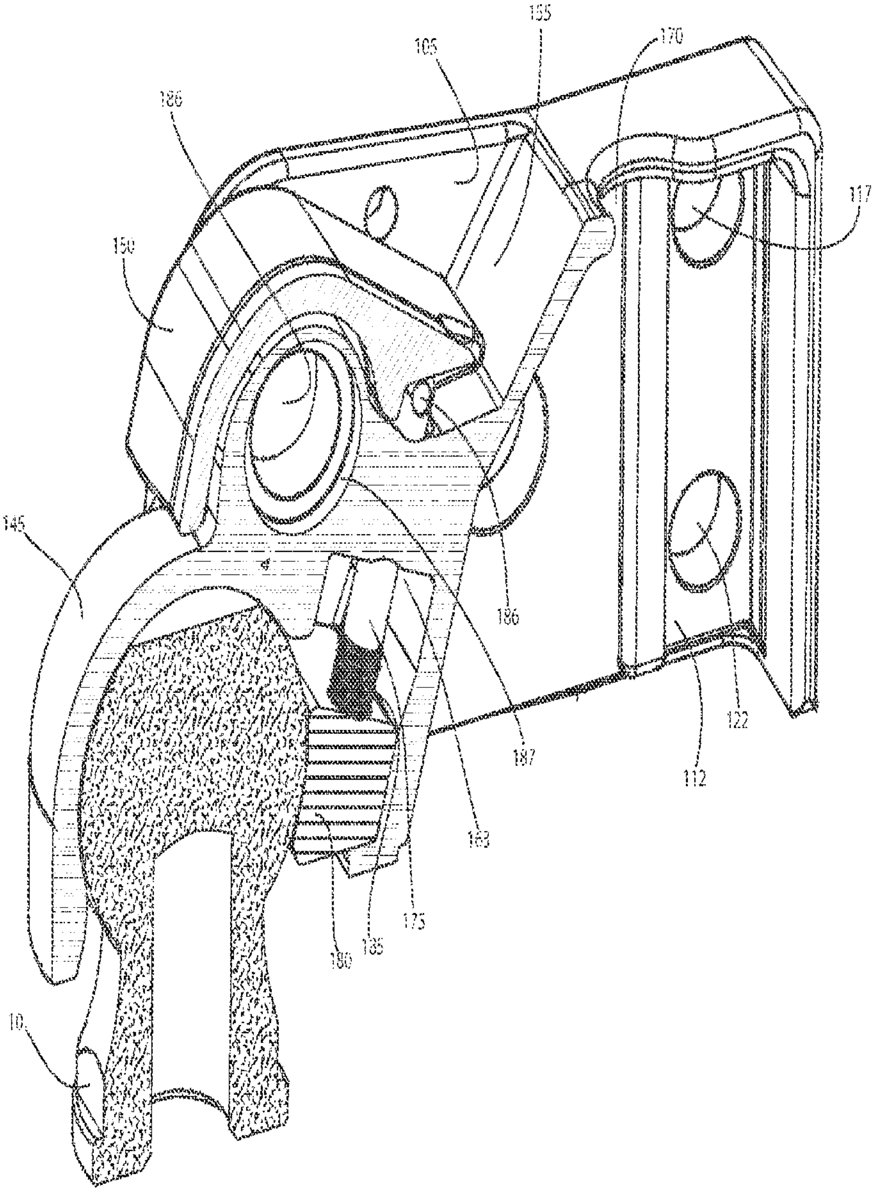
FIG. 3 is a first perspective section view of an exemplary coupler locked to a hitch ball according to principles of the invention.
Figure 4:
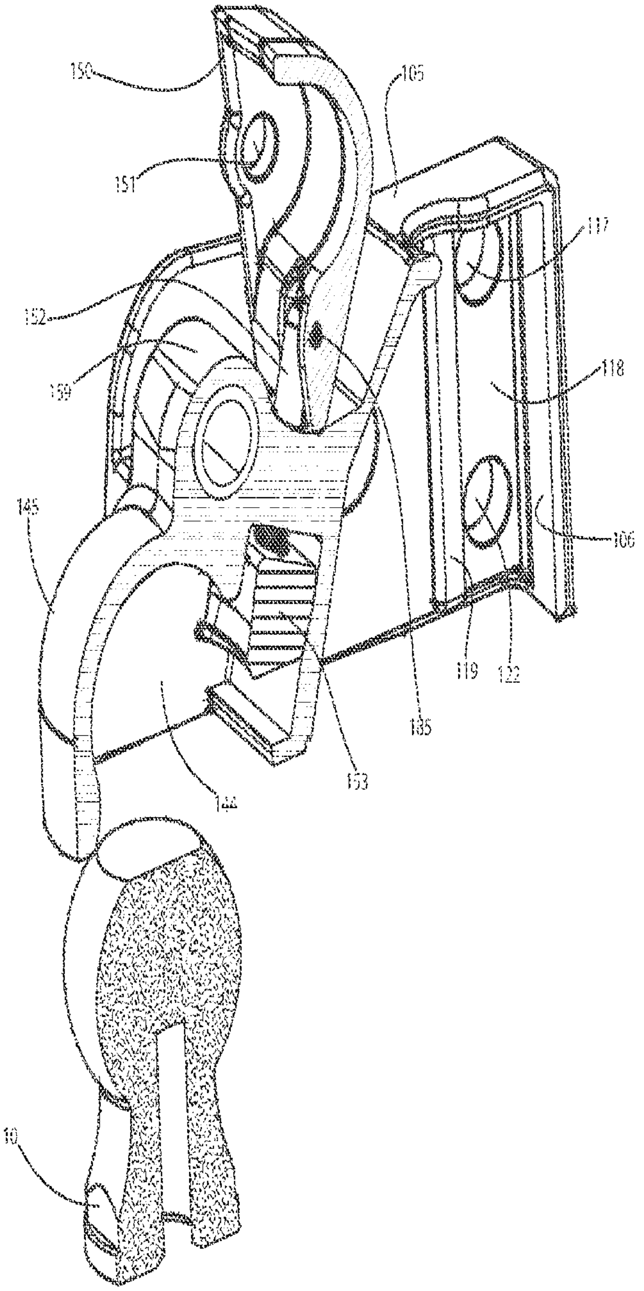
FIG. 4 is a second perspective section view of an exemplary coupler unlocked from a hitch ball according to principles of the invention.

In FIG. 2 the exemplary coupler 100 is shown with the lock cover 135 pivoted to an open position. The lock core (aka lock mechanism), comprised of the lock plug 165 and cylinder 160, is partially withdrawn from the coupler 100. When the lock plug 165 and cylinder 160 are sufficiently partially withdrawn, the locking mechanism, comprised of the lock plug 165 and cylinder 160, is unlocked. The lock pin 162, which is attached to the cylinder 160, moves with the cylinder 160. When the locking mechanism is unlocked, the latch handle 150 may be pivoted from the locked position as shown in FIGS. 1-3, to the unlocked or open position as shown in FIG. 4. When the latch handle 150 is in the unlocked position, the coupler 100 may be freely removed from the hitch ball 10 in a conventional manner, such as by elevating the coupler 100 in relation to the hitch ball 10.

As shown in FIG. 2, a substantial portion of the handle 150 fits within a compartment 155 formed in the top of the coupler body 105. The handle 150 extends nearly from side to side of the compartment 155, leaving only minimal space between the side edges of the handle 150 and the sides of the compartment 155. Such minimal space allows motion of the handle 150 with rubbing against the sides of the compartment 155. This configuration of the handle 150 improves security by concealing key components of the coupler 100 that reside below the handle 150.

Figure 5A:
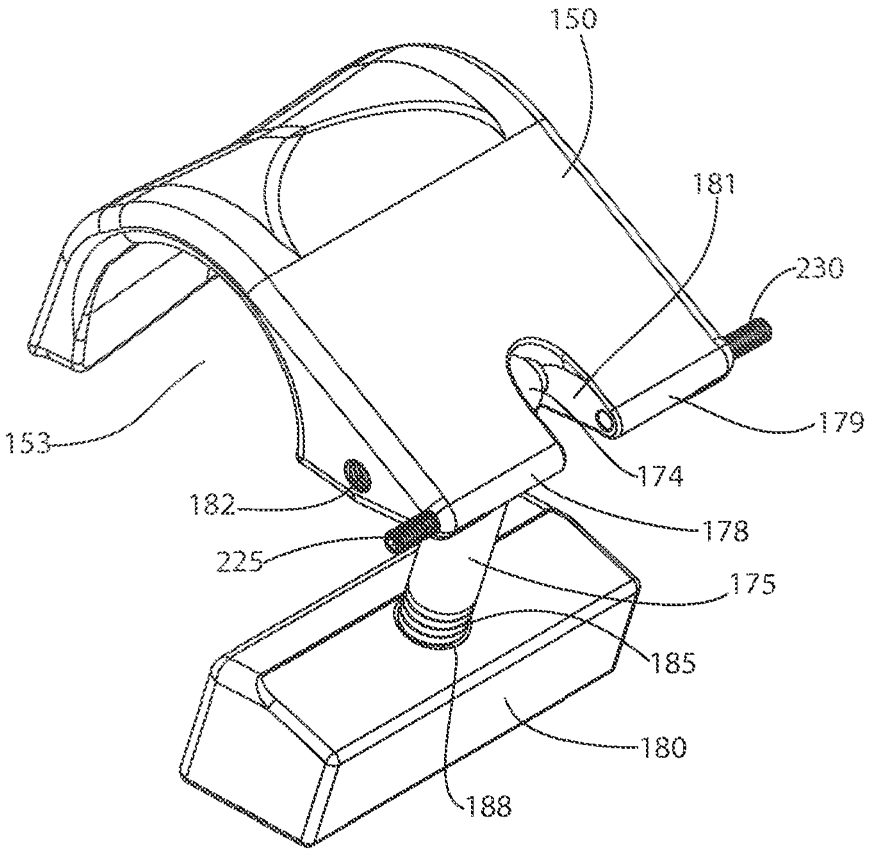
FIG. 5A is a first perspective view of an exemplary handle, connecting rod and underjaw for a coupler according to principles of the invention.
Figure 5B:
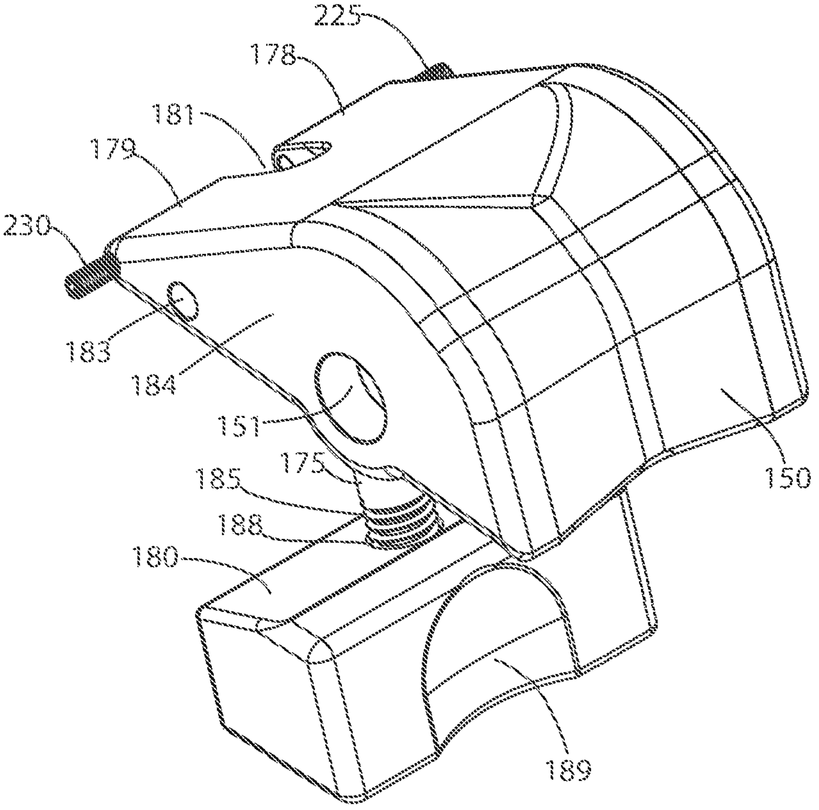
FIG. 5B is a second perspective view of an exemplary handle, connecting rod and underjaw for a coupler according to principles of the invention.

The section views of FIGS. 3 and 4 and perspective view of FIGS. 5A and 5B reveal internal components of the coupler 100. When the handle 150 is pivoted from a locked position as shown in FIG. 3 to an unlocked position as shown in FIG. 4, a connecting rod 175, which is pinned with pin 185 to the handle 150 at one end 174, having a pin slot, moves substantially linearly (i.e., reciprocates). The movement of the connecting rod 175 causes the underjaw 180 to move. A threaded end 185 of the connecting rod 175 engages a threaded channel 188 through the underjaw 180. The underjaw 180 is a block-like polyhedron with one concave face 189 contoured to mate with (i.e., abut and conform to) the hitch ball 10. In the locked position, the underjaw 180 abuts the hitch ball 10 at lest partially below a horizontal plane that extends through the center of the ball of the hitch ball 10. In the locked position, the abutting underjaw 180 impedes and prevents removal of the hitch ball 10 from the socket 144. In the unlocked position, the underjaw 153 has been moved linearly, into a channel 163 configured to receive the underjaw 180, above and away (obliquely) from the plane. In the unlocked position, the underjaw 180 no longer impedes or prevents removal of the hitch ball 10 from the socket 144.

As shown in FIGS. 5A and 5B, The handle 150 includes a concave underside 153 that is sized and shaped to receive and cover the lock section 159 of the coupler body 105. A locking portion 184 of the latch handle 150 includes an aperture 151 sized and shaped to allow passage of the locking pin 162, when the locking pin 162 is in a locked position. The latch handle 150 pivots about pins 225, 230 (FIG. 10, screws 225, 230) that extend from the core body 105 into pin holes in the tail ends 178, 179 of the latch handle 150. Another pin couples the connecting rod 175 to the latch handle 150 at the slot 181. During pivoting motion, the tail ends 178, 179 of the latch handle pivot within the compartment 155. Such pivoting causes movement (i.e., raising or lowering) of the connecting rod 175.

Figure 11:
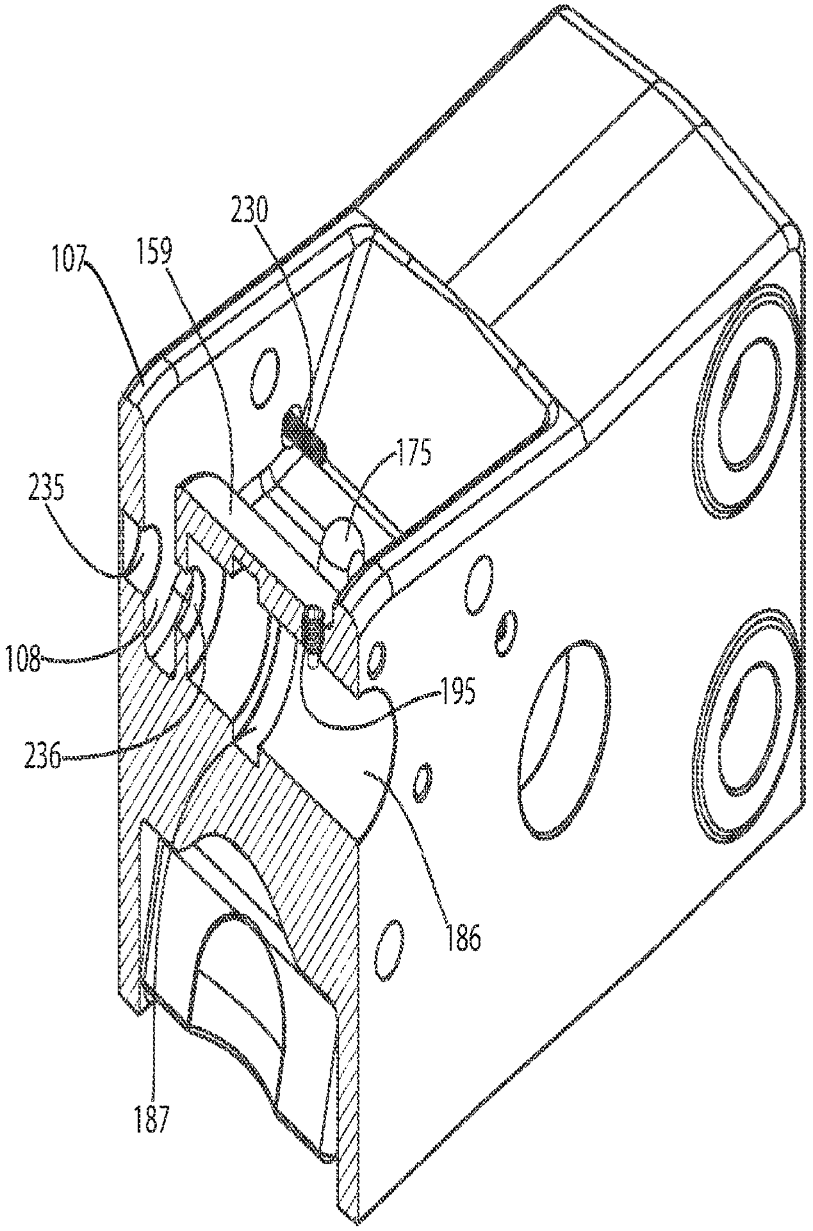
FIG. 11 is a perspective section view of an exemplary coupler with a removed locking mechanism according to principles of the invention.

The section views of FIGS. 3, 4 and 11 show a portion of a lock channel 186 and annular groove 187 with a lock plug 165 and cylinder 160 removed. An annular groove 187 is provided in the lock channel. The annular groove 187 may extend 360 degrees. The groove 187 is configured (i.e., sized, shaped and located) to receive the lug(s) 166 (FIG. 9) of the lock plug 165, when the lugs 166 extend radially when the lock plug 165 is in a locked position. The lock plug 165 may rotate 360 degrees with the lugs 166 within the groove. Thus, the lugs 166 cannot be sheared off by spinning the lock plug 165.

Figure 8:
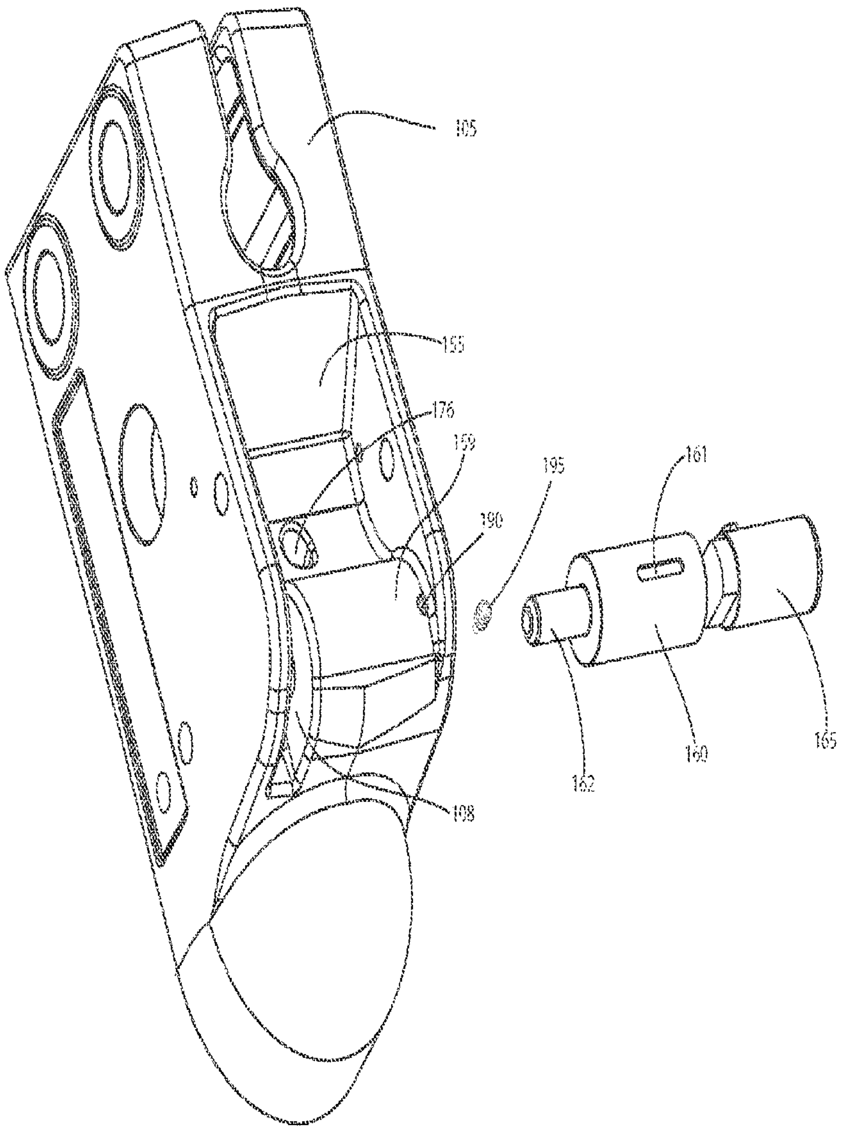
FIG. 8 is a perspective view of an exemplary coupler with a removed locking mechanism according to principles of the invention.
Figure 9:
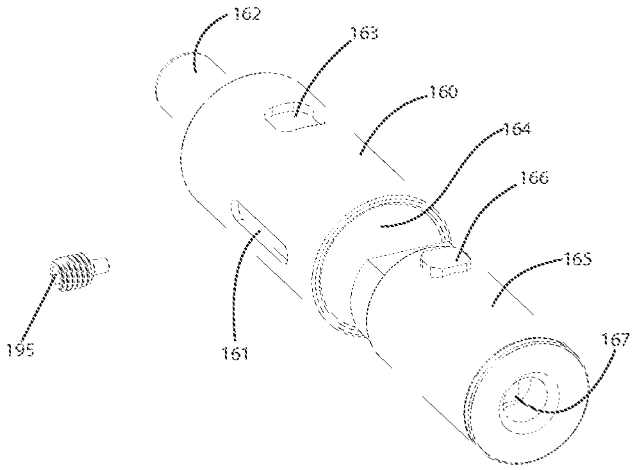
FIG. 9 is a perspective view of an exemplary locking mechanism for a coupler according to principles of the invention.

An exemplary lock mechanism is shown in FIGS. 8 and 9. The lock mechanism includes a cylinder 160, a plug or core 165 and a locking pin 162. The pin 162 and cylinder 160 are coaxial. The pin 162 extends from a closed end of the cylinder 160. The core 165 fits within the compartment 164 of the cylinder 160. The lock plug 165 includes at least one lug 166 that aligns with a window 163 of the cylinder 160 and extends radially when the lock plug 165 is in a locked position, and retracts radially to an elevation about even with the cylinder 160 when the lock core is in an unlocked position. The lug 166 may be a polyhedron, cylinder or an oval cross-section bar or other structure. In one exemplary embodiment, the lock mechanism and/or the plug or core is removable from the lock channel 186 and replaceable.

An annular groove 187 is provided in the lock channel 186. The annular groove 187 may extend 360 degrees. The groove 187 is configured (i.e., sized, shaped and located) to receive the lug(s) 166 of the lock plug 165, when the lugs 166 extend radially when the lock plug 165 is in a locked position. The lock plug 165 may rotate 360 degrees with the lugs within the groove. Thus, the lugs 166 cannot be sheared off by spinning the lock plug 165.

The cylinder 160 includes a longitudinal slot 161. The longitudinal slot 161 has a proximal end and a distal end. The proximal end is closer than the distal end to the opening of lock channel 186. A set screw 195 is threaded into a threaded channel 190 in the lock section 159. A tip of the set screw 195 extends into the longitudinal slot 161. When the lock plug 165 is the locked position, the set screw 195 extends into the longitudinal slot 161 at or proximate the proximal end. When the lock plug 165 is the unlocked position, the lugs 166 are removed from the annular groove 187 and the lock plug 165 and cylinder 160 may slide outwardly from the channel 186 until the tip of the set screw 195 hits the distal end of the slot 161. The range of travel is sufficient to withdraw the locking pin 162 from the cavity 235 in the locking panel 107 and from the aperture 151 of the locking portion 184 of the latch handle 150. Thus, by unlocking and sliding the lock plug 165 and cylinder 160 outwardly until stopped by the set screw 195, the locking pin 162, which is attached to the cylinder 160, is withdrawn from the cavity 235 in the locking panel 107 and from the aperture 151 of the locking portion 184 of the latch handle 150. Then the handle 150 may be pivoted to an unlatched position.

The lock plug 165 includes a key slot 167. The lock plug 165 is not limited to a particular key slot. Tubular key slots and tubular keys may be used without departing from the scope of the invention.

A conventional vending machine lock (i.e., vending style lock) may be used as a lock mechanism, or as a lock plug, in accordance with principles of the invention. Any vending machine lock with a lug that extends radially when locked may be used in combination with a cylinder and pin as described above. Advantageously, such vending machine locks are ubiquitous. Thus replacement and re-keying is made easy. A user may select a vending machine lock with a tubular key, or a flat key, having any commercially available level of security, and comprised of any commercially available materials for such locks. Thus, a coupler according to principles of the invention provides a structure into which a user-selected vending machine lock may be installed and used.

Figure 10:
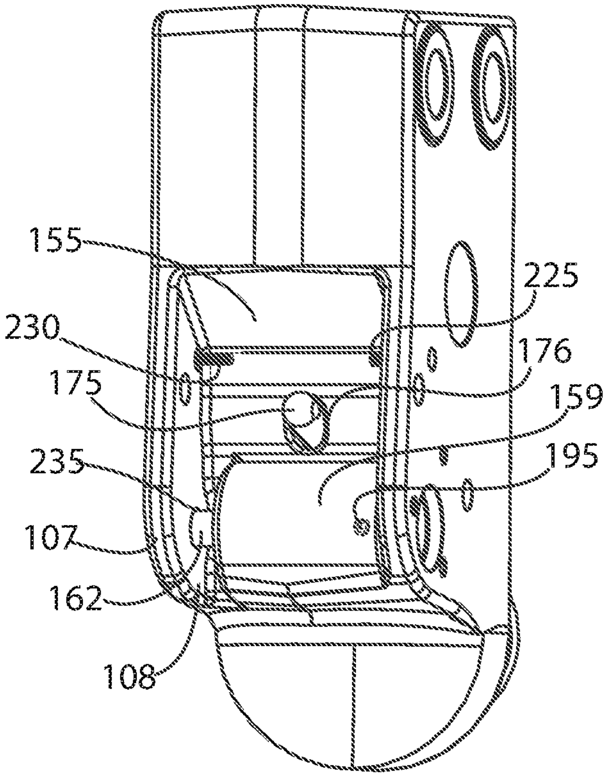
FIG. 10 is a perspective view of an exemplary coupler with a latch handle removed according to principles of the invention.

FIG. 10 provides a perspective view of an exemplary coupler 100 with a latch handle 150 removed to expose the compartment 155 formed in the top of the coupler body 105, lock section 159, the top 174 of the connecting rod 175 extending from the connecting rod channel 176, pins 225, 230, the locking pin 162 extending into the cavity 235 in the locking panel 107 and across the gap 108 between the locking panel 107 and the lock section 159.

In sum, a trailer coupler 100 according to principles of the invention includes an integrated lock. The trailer coupler 100 includes a coupler body 105 with a lock section 159. A lock channel 186 extends substantially through the lock section 159 of the body 105. A lock mechanism (which includes a cylinder 160, a plug or core 165 and a locking pin 162 that extends from the cylinder 160) is inserted into the lock channel 186 in the coupler body 105. A locking end of the lock section of the coupler body, includes an aperture 236 sized and shaped to allow passage of the locking pin 162, when the locking pin 162 is in a locked position. A latch handle 150 includes a locking portion 184 that aligns with the aperture 236 of the lock section 159, when the latch handle 150 is in a locked position. The locking portion 184 of the latch handle 150 includes an aperture 151 sized and shaped to allow passage of the locking pin 162, when the locking pin 162 is in a locked position. Thus, when the locking pin 162 is in a locked position, the locking pin 162 extends through the aperture 236 in the locking end of the lock section 159 of the coupler body 105 and also through the aligned aperture 151 in the locking portion 184 of the latch handle 150. Additionally, the coupler body 105 may include a locking panel 107. The locking portion 184 of the latch handle 150 is disposed in a gap 108 between the locking panel 107 and the aperture 236 in the locking end of the lock section 159 of the coupler body 105, when the latch handle 150 is in a locked position. The locking panel 107 may include a cavity 235 that is sized and shaped to receive a free end of the locking pin 162 when the locking pin 162 is in a locked position. Thus, when the locking pin 162 is in a locked position, the locking pin 162 extends through the aperture 236 in the locking end of the lock section 159 of the coupler body 105 and also through the aligned aperture 151 in the locking portion 184 of the latch handle 150, and into the cavity 235 in the locking panel 107. The locking panel 107 is spaced apart from the aperture 236 in the locking end of the lock section 159 of the coupler body 105. The space (gap 108) between the locking panel 107 and the aperture 236 in the locking end of the lock section 159 of the coupler body 105 is a gap 108 in which the locking portion 184 of the latch handle 150 is received when the latch handle 150 is in a locked position. Preferably, the gap 108 is not much wider than necessary to receive the locking portion 184 of the latch handle 150 when the latch handle 150 is in a locked position. Additionally, the outermost surface of the latch handle 150 substantially covers the gap 108. Thus, when the latch handle 150 is in the locked position, the portions of the locking pin 162 that extend from the aperture 236 in the locking end of the lock section 159 of the coupler body 105 and through the aligned aperture 151 in the locking portion 184 of the latch handle 150 and into the cavity 235 in the locking panel 107 are all covered or substantially covered by the outermost surface of the latch handle 150. Therefore, the locking pin 162 is protected from access with a saw blade.

The lock plug (core) 165 includes at least one lug 166 that extends radially when the lock core is in a locked position, and retracts radially to an elevation about even with a window 163 the cylinder 160 when the lock plug 165 is in an unlocked position. The lug 166 may be a polyhedron or cylinder or other appropriate shape for a lug.

An annular groove 187 is provided in the lock channel 186. The annular groove 187 may extend 360 degrees. The groove 187 is configured (i.e., sized, shaped and located) to receive the lug(s) 166 of the lock plug 165, when the lugs 166 extend radially when the lock plug 165 is in a locked position. The lock plug 165 may rotate 360 degrees with the lugs 166 within the groove 187. Thus, the lugs 166 cannot be sheared off by spinning the lock plug 165.

The cylinder 160 includes a longitudinal slot 161. The longitudinal slot 161 has a proximal end and a distal end. The proximal end is closer than the distal end to the opening of lock channel 186. The distal end is closer than the proximal end to the aperture 236 of lock channel 186. A set screw 195 is threaded into a threaded channel in the lock section 159. A tip of the set screw 195 extends into the longitudinal slot 161. When the lock plug 165 is in the locked position, the set screw 195 extends into the longitudinal slot 161 at or proximate the proximal end. When the lock plug 165 is the unlocked position, the lugs 166 are removed from the annular groove 187 and the lock plug 165 may slide outwardly from the channel 186 until the tip of the set screw 195 hits the distal end of the slot 161. The range of travel is sufficient to withdraw the locking pin 162 from the cavity 235 in the locking panel 107 and from the aperture 151 of the locking portion 184 of the latch handle 150. Thus, by unlocking and sliding the lock plug 165 and the cylinder 160 outwardly until stopped by the set screw 190, the locking pin 162 is withdrawn from the cavity 235 in the locking panel 107 and from the aperture 151 of the locking portion 184 of the latch handle 150, and the handle 150 may be pivoted to an unlatched position.

A connecting rod 175 couples the base of the latch handle 150 to an underjaw 180. The underjaw 180 is a polyhedron with a face (e.g., concave face 189) configured to abut a portion of a trailer hitch ball. The connecting rod 175 extends through a channel 176 in the core body 105. The connecting rod channel 176 extends to an underjaw channel 163 at the back side of the coupler socket 144. The underjaw 180 is positioned against at least a portion of the bottom half of a trailer hitch ball 10 when the underjaw 180 is in a locked position. The underjaw 180 is withdrawn away from the trailer hitch ball and into the underjaw channel 163 when the underjaw 180 is moved to an unlocked position. The motion of the underjaw 180 is caused by reciprocating motion of the connecting rod 175 within the connecting rod channel 176. Pivoting motion of the latch handle 150 causes the reciprocating motion of the connecting rod 175 within the connecting rod channel 176. The latch handle 150 is restrained from such pivoting motion when it is locked by the locking pin 162. The latch handle 150 is unrestrained from such pivoting motion when the locking pin 162 is withdrawn from the cavity 235 in the locking panel 107 and from the aperture 151 of the locking portion 184 of the latch handle 150.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A trailer coupler comprising:

a coupler body including a hitch ball socket, a lock section proximate to the hitch ball socket, a lock channel formed in the lock section, the lock channel including an open end;

a lock mechanism movable from a locked position in the lock channel to an unlocked position, and, in the locked position, the lock channel containing the lock mechanism;

an annular groove in the lock channel; and the lock mechanism including at least one lug, the at least one lug extending radially from the lock mechanism into the annular groove when the lock mechanism is locked.

2. The trailer coupler of claim 1, the lock channel further comprising a closed end with a pin aperture, the closed end being opposite the open end, and the trailer coupler further comprising a locking pin extending from the lock mechanism, and in the locked position the locking pin extending through the pin aperture.

3. The trailer coupler of claim 2, further comprising:

a latch handle, a lock aperture in the latch handle, a pivot pin coupling the latch handle to the coupler body, the latch handle movable from a locked position to an unlocked position, and in the locked position the locking pin extending through the pin aperture and at least partially through the lock aperture in the latch handle.

4. The trailer coupler of claim 3, further comprising a connecting rod coupling the latch handle to an underjaw, the underjaw being adjacent to the hitch ball socket when the latch handle is in the locked position.

5. The trailer coupler of claim 2, further comprising: a latch handle, the latch handle including a locking portion and a lock aperture in the locking portion of the latch handle;

a pivot pin coupling the latch handle to the coupler body, the latch handle movable from a locked position to an unlocked position, and in the locked position the locking pin extending through the pin aperture and at least partially through the lock aperture in the locking portion of the latch handle.

6. The trailer coupler of claim 5, the coupler body further comprising a locking panel, the locking panel including a pin cavity, the pin cavity being aligned with and spaced apart from the pin aperture; and in the locked position the locking pin extending through the pin aperture, through the lock aperture in the locking portion of the latch handle and into the pin cavity.

7. The trailer coupler of claim 6, the locking portion of the latch handle being disposed in a gap between the locking panel and the lock channel when the latch handle is in a locked position.

8. The trailer coupler of claim 7, the latch handle substantially covering the gap when the latch handle is in a locked position.

9. The trailer coupler of claim 1, the coupler body being an integrally formed structure.

10. The trailer coupler of claim 1, further comprising a lock channel cover, the lock channel cover being movable from a covered position to an uncovered position, and in the covered position, the lock channel cover covering the open end of the lock channel.

11. The trailer coupler of claim 1, in the unlocked position, the lock mechanism extending at least partially from the lock channel.

12. A trailer coupler comprising:

a coupler body, the coupler body being integrally formed and including a hitch ball socket in which a hitch ball is received, a lock section, a lock channel formed in the lock section, the lock channel including an open end and a closed end with a pin aperture;

a lock mechanism and a locking pin, the locking pin extending from the lock mechanism, the lock mechanism movable from a locked position in the lock channel to an unlocked position; and a latch handle, a lock aperture in the latch handle, a pivot pin coupling the latch handle to the coupler body, the latch handle movable from a locked position to an unlocked position, and in the locked position the locking pin extending through the pin aperture and at least partially through the lock aperture in the latch handle; and a connecting rod coupling the latch handle to an underjaw, the underjaw abutting the hitch ball and preventing removal of the hitch ball from the hitch ball socket when the latch handle is in the locked position;

an annular groove in the lock channel; and the lock mechanism including at least one lug, the at least one lug extending radially from the lock mechanism into the annular groove when the lock mechanism is locked.

13. The trailer coupler of claim 12, the coupler body further comprising a locking panel, the locking panel including a pin cavity, the pin cavity being aligned with and spaced apart from the pin aperture; and in the locked position the locking pin extending through the pin aperture, through the lock aperture in the latch handle and into the pin cavity.

14. The trailer coupler of claim 13, wherein the latch handle is being disposed in a gap between the locking panel and the lock channel when the latch handle is in a locked position.

15. The trailer coupler of claim 14, the latch handle substantially covering the gap when the latch handle is in a locked position.

16. The trailer coupler of claim 12, further comprising a lock channel cover, the lock channel cover being movable from a covered position to an uncovered position, and in the covered position, the lock channel cover covering the open end of the lock channel.

17. A trailer coupler comprising:

a coupler body including a hitch ball socket, a lock section, a lock channel formed in the lock section, the lock channel including an open end;

a vending style lock movable from a locked position in the lock channel to an unlocked position, and, in the locked position, the lock channel containing the vending style lock, and the vending style lock being removable from the lock channel;

an annular groove in the lock channel; and the vending style lock including at least one lug, the at least one lug extending radially from the vending style lock into the annular groove when the vending style lock is locked.

* * * * *